United States Patent

Parrent

[15] 3,697,109
[45] Oct. 10, 1972

[54] CONTACT LENS INSERTER

[72] Inventor: Ottis L. Parrent, 368 East 64th Avenue, Hialeah, Fla. 33102

[22] Filed: March 30, 1971

[21] Appl. No.: 129,361

[52] U.S. Cl. ............................294/1 CA, 128/303
[51] Int. Cl. .................................................G02c 11/00
[58] Field of Search .....294/1 CA, 25, 64 R; 128/303

[56] References Cited

UNITED STATES PATENTS 3,177,874    4/1965    Spriggs....................294/1 CA Primary Examiner—Evon C. Blunk
Assistant Examiner—I. Kenneth Silverman
Attorney—Berman, Davidson and Berman

[57] ABSTRACT

A contact lens inserting apparatus consisting of an upstanding support with a pair of horizontal parallel tubes slidably mounted on the support, spaced by the same spacing as the eyes. The tubes have seats at their ends in which contact lenses can be removably mounted. Respective lamps project into slots in the tubes and are energized from a source of current carried by the support. A chin rest is provided subjacent the tubes. The tubes can be manually moved longitudinally by the user to place the lenses in his eyes while his chin is supported on the chin rest.

12 Claims, 8 Drawing Figures

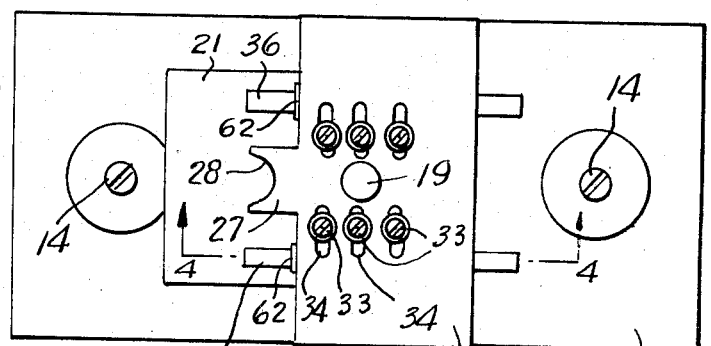
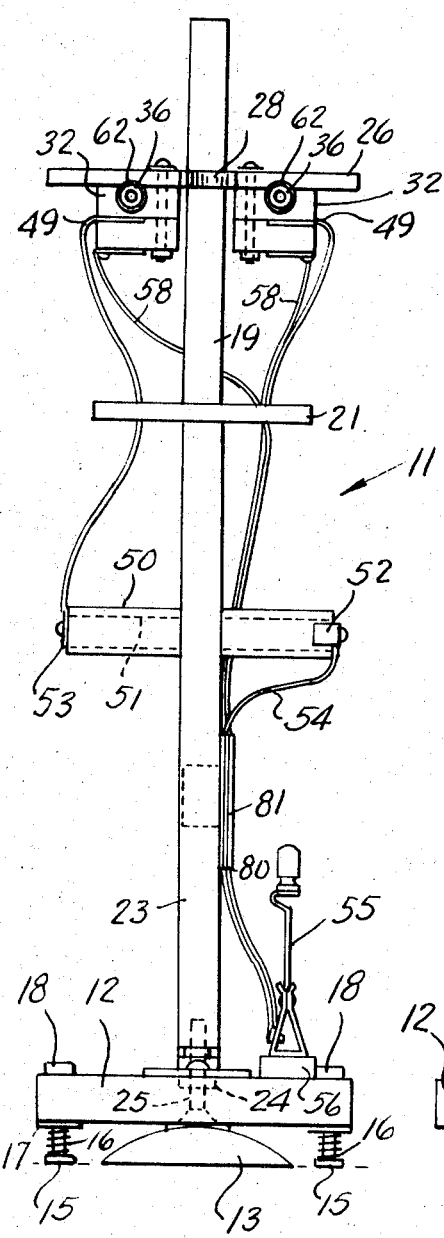
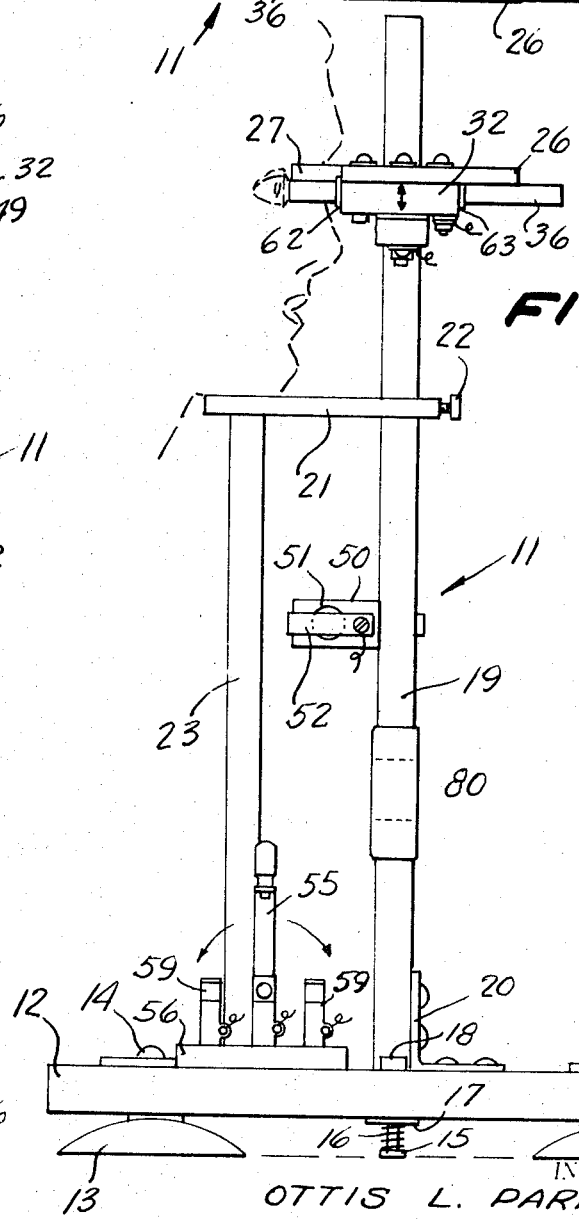

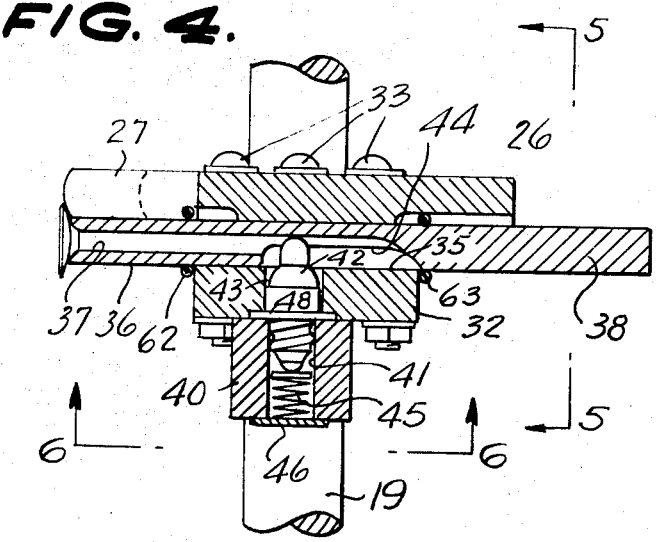
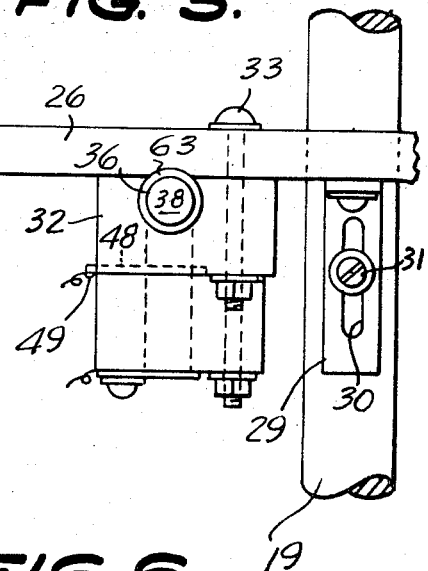
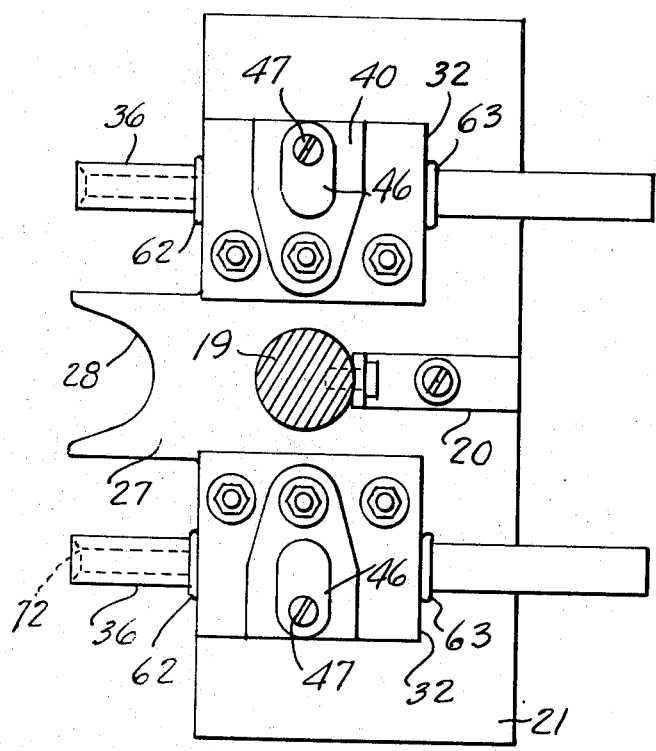
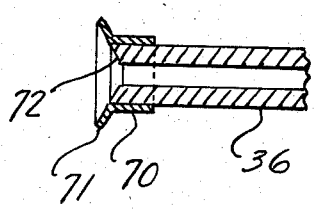
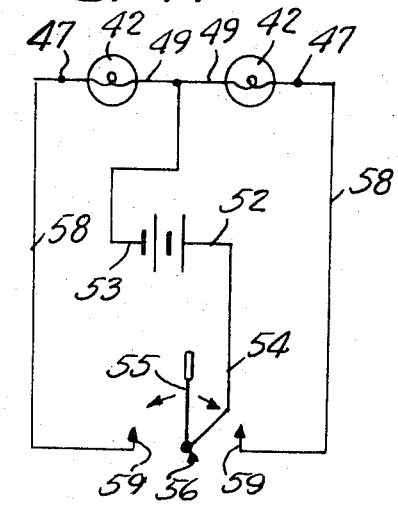

CONTACT LENS INSERTER

This invention relates to devices for inserting contact lenses, and more particularly to an apparatus which may be employed by a person for inserting a contact lens in each of his eyes in a mechanical and accurate manner.

A main object of the invention is to provide a novel and improved apparatus for inserting contact lenses, the apparatus being simple in construction, being easy to use, and enabling a person to mechanically insert contact lenses in his eyes by simple manipulations and without pain or discomfort.

A further object of the invention is to provide an improved apparatus for inserting contact lenses, the apparatus involving inexpensive parts, being durable in construction, being relatively compact in size, and providing accurate insertion of the lenses in the user's eyes with minimum risk of dropping or damaging the lenses and with minimum discomfort during insertion.

A still further object of the invention is to provide an improved contact lens inserter which automatically places contact lenses in a person's eyes without the necessity of adjusting the lenses after they have been inserted and being so arranged that no assistance is required by a person in inserting his contact lenses, the apparatus enabling a person to quickly and easily insert his contact lenses with minimum discomfort.

Further objects and advantages of the invention will become apparent from the following description and claims, and from the accompanying drawings, wherein:

FIG. 1 is a top plan view of an improved contact lens inserting apparatus constructed in accordance with the present invention.

FIG. 2 is a side elevational view of the apparatus of FIG. 1.

FIG. 3 is a front elevational view of the apparatus of FIG. 1.

FIG. 4 is an enlarged fragmentary vertical cross-sectional view taken substantially on the line 4—4 of FIG. 1.

FIG. 5 is an enlarged fragmentary elevational view taken substantially on the line 5—5 of FIG. 4.

FIG. 6 is a cross-sectional view taken substantially on the line 6—6 of FIG. 4.

FIG. 7 is an electrical wiring diagram showing the circuit connections of the viewing lamps employed in the apparatus of FIGS. 1 to 6.

FIG. 8 is an enlarged fragmentary longitudinal cross-sectional view taken through the forward end portion of one of the lens-holding tubes, showing the use of an adapter for relatively large lenses.

Referring to the drawings, 11 generally designates an improved contact lens inserting apparatus constructed in accordance with the present invention. The apparatus 11 comprises a rectangular base plate 12 which is provided with means for resiliently supporting and releasably securing it in place on a table surface or the like. Said means comprises a pair of suction cups 13,13 secured to the opposite end portions of the plate 12 along its longitudinal center line, as by fastening screws 14,14. Plate 12 is further provided with a pair of spring-biased abutment screws 15,15 located on the transverse median center line of plate 12 adjacent the opposite longitudinal margins thereof and being slidably engaged through apertures in the plate, being biased downwardly by coil springs 16 bearing between the heads of the bolts and abutment washers 17 surrounding the bolts and in contact with the bottom surface of the plate. Adjustable nuts 18 are provided on the top ends of the bolts. Thus, with the plate member 12 secured on a smooth table or a similar supporting surface by the suction cups 13, the nuts 18 may be adjusted to provide the correct horizontal position of the supporting plate 12.

Designated at 19 is an upstanding post member which is rigidly secured on base 12 by an angle bracket 20, whereby the post member 19 is supported in a vertical upstanding position. Adjustably clamped to the post member 19 is a horizontal chin rest plate 21, the plate 21 being adjusted to the proper height for the individual using the apparatus, as will be presently described, and being locked in adjusted position by a thumb screw 22 threadedly engaged through the front edge portion of the plate 21 adjacent to the aperture thereof receiving the post member 19, the thumb screw 22 extending into said aperture and being clampingly engageable with the post member 19. For rigidly supporting the plate member 21 in its adjusted position, a vertical supporting dowel 23 may be employed, the dowel being cut to the proper length corresponding to the adjusted distance of plate member 21 from base plate 12 and being fastened beneath the rear portion of plate 21 and being received in a suitable recess or socket 24 provided therefor on plate 12. The bottom end of the dowel 23 may be fastened to plate member 12 by a suitable fastening bolt 25 extending through plate member 12 and threadedly engaged in the bottom end portion of dowel 23.

Adjustably secured on the post member 19 above the chin plate 21 is another horizontal plate 26 having a central lug or projection 27 on its left edge, as viewed in FIG. 1, the lug or projection 27 being provided with a notch 28 adapted to receive the bridge of the user's nose. Thus, the plate 26 is adapted to be adjusted in accordance with the height of the user's eyes with the user's chin resting on the chin plate 21, in which position the user's nose will engage comfortably in the notch 28. As shown in FIG. 5, the plate member 26 is provided with supporting angle bars 29 having depending legs located on opposite sides of the post member 19, the angle bars being formed with vertical slots 30 through which extend clamping screws 31 engaged in the post member 19, whereby the plate member 26 may be clamped at an adjusted height on post member 19.

A pair of outwardly adjustable block members 32,32 are secured to the plate 26 at the bottom surface of the plate, the block members being fastened to the plate 26 by a plurality of fastening screws 33 which extend through transversely directed slots 34 in plate member 26. Each block 26 is formed with a longitudinally extending groove 35 in which is slidably engaged a tube 36 having a bore 37. The tube may comprise a rod having a solid rear end portion 38 with the bore 37 extending through the forward portion of the rod, as shown in FIG. 4. Secured to each block 32 at its bottom surface is a lamp socket block 40 having a vertical bore 41 in which is positioned a lamp 42 extending through a vertical bore 43 formed in the associated block 32 and extending through a longitudinal slot or aperture 44 formed in the associated tube 36, whereby the top end of the lamp 42 projects into the bore 37, as shown in FIG. 4. The center contact of each lamp 42 is electrically connected through a conventional contact spring 45 to a terminal plate 46 secured to the underside of the associated socket member 40 by a fastening screw 47, which thereby forms one energizing terminal for the associated lamp 42. The shell of each lamp base is engaged in a contact plate 48 which is provided with an external terminal 49, forming the other energizing terminal of the lamp.

Secured on post member 19 beneath the chin plate 21 is a block 50 formed with bore 51 in which are mounted suitable batteries arranged in series and whose end terminals are engaged by metallic contact springs 52 and 53. The spring 52 is connected by a suitable wire 54 to the pole 55 of a single pole double throw switch 56 mounted on the main supporting plate 12. The center contact terminal screws 47 are connected by respective wires 58,58 to the opposite stationary contacts 59,59 of switch 56. The shell terminals 49,49 are connected to the remaining battery terminal spring 53. It will thus be readily apparent that either of the lamps 42 may be energized in accordance with the direction of closure of the switch pole 55.

Front and rear O-rings 62 and 63 are provided on each tube 36, the ring 62 being adjacent to the front side of the supporting block 32 and the ring 63 being adjacent the rear side of said supporting block. The O-rings 62 and 63 are adjustable on the tubes 36 and may be employed to define stop means for limiting the position of each tube 36 in its associated supporting block 32, or for limiting the movements of the associated tube 36, as will presently be described.

For accommodating relatively large lenses there may be engaged on the front end of each tube 36 an annular rubber collar 70 having a flared front flange 71 merging with a frusto-conical bevel 72 formed in the front end rim of the associated tube 36. This defines a socket for supportingly receiving a contact lens to be inserted in the user's eye, as will presently be described. For ordinary contact lenses the socket or recess 72 is usually sufficient and the use of the adapter collar 70 is not required.

With the apparatus 11 suitably mounted on a smooth table or other smooth support, as above described, with the chin rest plate 21 adjusted for the user in relation to the position of the nose piece plate 26, namely, as illustrated in FIG. 3, the blocks 32 are laterally adjusted so that the respective tubes 36 are aligned with the user's eyes. The blocks 32 are clamped in these positions by tightening their associated clamping bolts 33. Switch pole 55 may be moved into engagement with one of the contacts 59 to thereby energize one of the lamps 42. This will illuminate the associated tube 36. Suitable wetting solution is then rubbed on the contact lenses, and some of the solution is placed on the bevelled rim portion of the illuminated tube, and the corresponding contact lens is placed in the bevelled seat 72 of said tube 36, as above described. With the user's chin resting on the plate 21 and his nose received in the notch 28, as illustrated in FIG. 3, the tube 36 carrying the contact lens can then be moved toward the user's eye until the user feels the lens in his eye, whereupon the user then closes his eye and the lens will then be in place. This same procedure can then be repeated for the user's other eye.

It will, therefore, be apparent that by illuminating the tube in the manner above described, the placement of the contact lens in its front seat 72 is greatly facilitated. The movement of the tubes 36 can be regulated by adjusting their stop rings 62 or 63. Thus, the back stop rings 63 may be adjusted to the limiting position of movement of the tubes 36 for lens insertion in the procedure above described. Alternatively, the front stop rings 62 may be adjusted so that they will hold the tubes 36 in such a position that when the user places his chin on the plate 21 and moves his nose into the notch 28, the contact lenses will be in exactly the correct inserted positions in the user's eyes so that by merely closing his eyes, the lenses will be in place. Thus, the above-described methods of lens insertion involve limited movement of the tubes 36 toward the user's eyes toward final positions wherein the rear O-rings 63 engage their supporting blocks 32, or the alternative procedure which maintains the tubes 36 in fixed positions with their front O-rings 62 engaging the front surface portions of the blocks 32 and the rear O-rings 63 engaging the rear surfaces of said blocks to hold the tube stationary. In the first of the above-described procedures, the user pushes the tubes 36 forwardly by finger pressure on the solid portions 38 of the tubes. Thus, in inserting a lens by this procedure, the user moves the tube 36 toward his eye until he feels the lens in his eye, at which position further forward movement of the tube is prevented by the engagement of the rear O-ring 63 with its associated block 32. Then, at this point, the user merely closes his eye and the lens is then in place.

The post member 19 is provided with a conventional wire-holding clip 80 having a wire-receiving sleeve portion 81 in which the various wires leading to the switch 56 are retained and held adjacent to the post member 19.

It will be understood that in the process of inserting the contact lenses, above described, the concave surfaces of the lens-holding seats 72 are covered with suitable wetting liquid, the lenses being likewise covered with this liquid, so that when the lenses are placed in the seats 72 the lenses will adhere to the concave surfaces of the seats 72 and will be held therein by the surface tension of the liquid. The lenses can therefore be temporarily secured in the seats 72 in the proper positions for insertion in the user's eyes. The adjustment of the lenses to such proper positions is facilitated by the energization of the associated lamps 42, which can be selectively energized by appropriate operation of switch pole 55.

It will thus be seen that with the parts in proper adjustment, as above explained, and with the contact lenses supported in the frusto-conical seats 72, the lenses can be easily and quickly inserted by following either of the two procedures above described, namely, the first procedure wherein the tubes 36 are pushed toward the user's eyes to limiting positions wherein the rings 63 engage the back surfaces of the blocks 32, or the second procedure wherein the tubes 36 are held in fixed positions such that the lenses will be automatically placed properly in the user's eyes when his nose is received in the curved notch 28.

As above explained, the rubber adapter collars 70, as shown in FIG. 8, may be employed for inserting relatively large contact lenses, the flanges 71 providing extensions of the frusto-conical seats 72.

While a specific embodiment of an improved apparatus for inserting contact lenses has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. An apparatus for inserting contact lenses comprising a supporting base member, an upstanding post element secured on said base member, a chin rest member secured on said post element, a nose-receiving member secured to said post element above said chin rest member, a pair of substantially parallel horizontal elongated members secured to said nose-receiving member and having ends extending over said chin rest member and spaced apart by a substantially interocular distance, and means to support contact lenses on said ends of said elongated members.

2. The apparatus of claim 1, and wherein said horizontal members have interior bores leading to said ends, and means to illuminate said interior bores.

3. The apparatus of claim 2, and wherein said illuminating means comprises respective lamp bulbs supported on said nose-receiving member and projecting into said interior bores.

4. The apparatus of claim 3, and wherein said elongated members are slidably adjustable longitudinally relative to said nose-receiving member.

5. The apparatus of claim 4, and wherein said elongated members comprise rod-like elements, and said nose-receiving member is provided with respective supporting blocks having grooves slidably receiving said rod-like elements.

6. The apparatus of claim 5, and means for laterally adjusting said supporting blocks relative to said nose-receiving member.

7. The apparatus of claim 6, and adjustable stop means on said rod-like elements engageable with the supporting blocks to limit longitudinal movement of said rod-like elements in said supporting blocks.

8. The apparatus of claim 7, and wherein said stop means comprises a pair of resilient rings clampingly engaged on each rod-like element adjacent opposite ends of its associated supporting block.

9. The apparatus of claim 8, and a source of current, a selecting switch, and circuit means connecting said source of current to said lamp bulbs through said selecting switch.

10. The apparatus of claim 9, and wherein said nose-receiving member comprises a substantially horizontal plate having a lug at one edge, said lug being formed with a nose-receiving notch, said lug being located substantially midway between said rod-like elements.

11. The apparatus of claim 2, and wherein said means to support contact lenses comprises respective collar members of resilient rubber-like material mounted on said ends of the elongated members, said collar members being formed with substantially frusto-conical flanges defining lens-receiving cavities communicating with said interior bores.

12. The apparatus of claim 11, and wherein said means to illuminate said interior bores comprises respective lamp bulbs projecting into the bores.

* * * * *